UNITED STATES PATENT OFFICE 2,511,835

ALKYLAMINOALKYLMERCAPTOALKYL ESTERS OF BENZILIC ACID

Raymond O. Clinton, Albany County, and Wolfgang Huber, Kings County, N. Y., and George M. Fohlen, Philadelphia County, Pa., assignors to Sterling Drug Inc., Wilmington, Del., a corporation of Delaware No Drawing. Application July 23, 1948, Serial No. 40,426

5 Claims. (Cl. 260—473)

This invention relates to basic esters derived from benzilic acid and sulfur-containing tertiary-aminoalkanols, to addition salts thereof, and to methods of preparing said basic esters.

We have found that basic esters having the following formula exhibit useful pharmacological properties:

$$(C_6H_5)_2C(OH)COO-Y-S-Z-B$$

where Y and Z are lower alkylene radicals; and B is a lower aliphatic tertiary-amino group.

In the above formula the groups designated as Y and Z, preferably have 2 to 4 carbon atoms, including such groups as $-CH_2CH_2-$, $$-CH_2CH_2CH_2-$$

$-CH_2CH_2CH_2CH_2-$, and $-CH_2CH(CH_3)-$. The lower aliphatic tertiary-amino group, shown above as B, comprehends lower dialkylamino groups illustrated by examples such as dimethylamino, diethylamino, ethylmethylamino, di-n-butylamino, and the like; and lower saturated N-heterocyclic groups illustrated by examples such as 1-piperidyl, 2-methyl-1-piperidyl, 1-pyrrolidyl, 4-morpholinyl, and the like. In other words, BH designates a lower aliphatic secondary-amine as illustrated by diethylamine, di-n-butylamine, 2,6-dimethylpiperidine, and the like.

Specific illustrations of our invention follow:

(1) 3 - (2 - dimethylaminoethylmercapto) - 1-propyl benzilate,

(2) 3 - (2 - diethylaminoethylmercapto) propyl benzilate, $(C_6H_5)_2C(OH)COOCH_2CH_2CH_2-$
$S-CH_2CH_2N(C_2H_5)_2$ (3) 3 - (3 - (1 - piperidyl) propylmercapto) - 2-propyl benzilate,

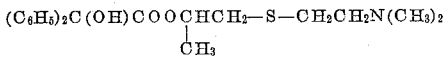

(4) 3 - (2 - (2 - methyl-1-piperidyl) ethylmercapto) -2-propyl benzilate,

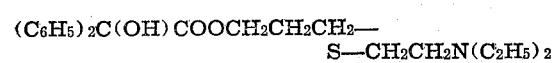

In practicing our invention we prepared our basic esters by reacting a lower alkyl ester of benzilic acid of the formula, $$(C_6H_5)_2C(OH)COO-(lower\ alkyl)$$

with the basic alcohol of the formula, B—Z—S—Y—OH, where B, Z, and Y have the meanings specified hereinabove, in the presence of a basic catalyst, such as sodium or a sodium alkoxide. While this reaction is run preferably in the presence of a basic catalyst, it is also operable in the absence of such a catalyst.

Preparation of the intermediate sulfur-containing tertiary-amino-alkanols are described in the literature by Clinton et al., J. Am. Chem. Soc. 67, 594 (1945) and ibid. 69, 519 (1947).

We found it convenient to isolate and use the basic esters of our invention as the water-soluble citric acid salts. It is, of course, understood that other water-soluble salts, such as those derived from other non-toxic organic acids, including tartaric acid, succinic acid, and the like, and other non-toxic inorganic acids, including hydrochloric acid, hydrobromic acid, sulfuric acid, phosphoric acid, and the like, have equivalent therapeutic efficacy and are within the scope of our invention.

Also comprehended by our invention are the quaternary salts of our basic esters, said salts being derived from esters of strong inorganic acids and organic sulfonic acids, and such esters including methyl bromide, ethyl sulfate, n-propyl iodide, benzyl chloride, methyl paratoluenesulfonate, and the like.

The following example illustrates specific embodiments of the invention.

*3-(2-Diethylaminoethylmercapto) propyl benzilate citrate.*—A mixture of 5 g. (0.02 mole) of methyl benzilate (prepared in excellent yield by refluxing benzilic acid in methanol in the presence of a small amount of sulfuric acid; crystals from methanol melt at 74–5° C.), 4 g. (0.02 mole) of 3-(2-diethylaminoethylmercapto) propanol, and 0.15 g. of sodium metal in 50 ml. of petroleum ether (fraction of mixed octanes) is refluxed at a pressure of about 30 mm. for four hours. An equal volume of benzene is added, and the mixture is washed several times with water and dried over anhydrous sodium sulfate. The oily residue remaining after removing the solvents in vacuo is taken up in dry acetone. To this acetone solution is added a solution of 4.2 g. (0.20 mole) of citric acid monohydrate in acetone, and the resulting solution is allowed to stand in the refrigerator. The precipitated white crystalline product is collected and recrystallized from acetone to give a 51% yield of 3-(2-diethylaminoethylmercapto) propyl benzilate citrate, M. P. 69–74° C. (with effervescence).

The above procedure also can be carried out by using sodium ethoxide as the basic catalyst in place of sodium or by using no basic catalyst.

Other basic esters are prepared according to the above procedure when other sulfur-containing tertiary-aminoalkanols are used. Thus, 2-(2-diethylaminoethylmercapto) ethyl benzilate is prepared when the basic alcohol is 2-(2-diethylaminoethylmercapto) ethanol; 3-(2-dimethylaminoethylmercapto)-2-propyl benzilate results when the basic alcohol is 3-(2-dimethylaminoethylmercapto)-2-propanol; and 2-(3-(1-piperidyl) propylmercapto) ethyl benzilate is formed when 2-(3-(1-piperidyl) propylmercapto)-ethanol is used.

We claim:

1. A basic ester having the formula $$(C_6H_5)_2C(OH)COO-Y-S-Z-B$$

where Y and Z are lower alkylene radicals; and B is a lower aliphatic tertiary-amino group; and addition salts thereof.

2. 3-(2-Diethylaminoethylmercapto) propyl benzilate.

3. 3-(2-Diethylaminoethylmercapto) propyl benzilate citrate.

4. An addition salt of 3-(2-diethylaminoethylmercapto) propyl benzilate.

5. The process of preparing a basic ester having the formula $$(C_6H_5)_2C(OH)COO-Y-S-Z-B$$

where Y and Z are lower alkylene radicals; and B is a lower aliphatic tertiary-amino group, which comprises reacting an ester of the formula $(C_6H_5)C(OH)COO-$(lower alkyl) with a basic alcohol of the formula HO—Y—S—Z—B.

RAYMOND O. CLINTON.
WOLFGANG HUBER.
GEORGE M. FOHLEN.

REFERENCES CITED

The following references are of record in the file of this patent:

UNITED STATES PATENTS

| Number | Name | Date |
|---|---|---|
| 2,399,736 | Holmes et al. | May 7, 1946 |
| 2,401,219 | Blicke | May 28, 1946 |

OTHER REFERENCES

Clinton et al., J. Am. Chem. Soc., vol. 67, p. 594 (1945).

Clinton et al., ibid, vol. 69, p. 519 (1947).

Certificate of Correction

June 20, 1950

Patent No. 2,511,835

RAYMOND O. CLINTON ET AL.

It is hereby certified that error appears in the printed specification of the above numbered patent requiring correction as follows:

Column 1, line 30, right-hand portion thereof, for "-1-" read -2-;

and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*